United States Patent
Kim et al.

(10) Patent No.: US 10,892,867 B2
(45) Date of Patent: Jan. 12, 2021

(54) METHOD FOR ESTABLISHING UPLINK DATA CHANNEL ON BASIS OF SHARED DEMODULATION REFERENCE SIGNAL, AND DEVICE THEREFOR

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 15 days.

(21) Appl. No.: 16/088,914

(22) PCT Filed: Mar. 8, 2017

(86) PCT No.: PCT/KR2017/002536
§ 371 (c)(1),
(2) Date: Sep. 27, 2018

(87) PCT Pub. No.: WO2017/171259
PCT Pub. Date: Oct. 5, 2017

(65) Prior Publication Data
US 2019/0222379 A1    Jul. 18, 2019

(30) Foreign Application Priority Data

Mar. 28, 2016 (KR) .................. 10-2016-0037224
Feb. 21, 2017 (KR) .................. 10-2017-0022964

(51) Int. Cl.
*H04L 5/00* (2006.01)
*H04W 72/04* (2009.01)
(Continued)

(52) U.S. Cl.
CPC ........ *H04L 5/0048* (2013.01); *H04L 27/2602* (2013.01); *H04L 27/2611* (2013.01);
(Continued)

(58) Field of Classification Search
None
See application file for complete search history.

(56) References Cited

U.S. PATENT DOCUMENTS

2014/0226607 A1    8/2014  Holma et al.
2014/0286255 A1    9/2014  Nam et al.
(Continued)

FOREIGN PATENT DOCUMENTS

KR    10-2015-0105306 A    9/2015
WO    2013/041138 A1    3/2013

OTHER PUBLICATIONS

LG Electronics, "Discussion on PUSCH transmission with TTI shortening", R1-160655, 3GPP TSG RAN WG1 Meeting #84, St Julian's, Malta, Feb. 15-19, 2016, pp. 1-7.
(Continued)

*Primary Examiner* — Peter Chen
(74) *Attorney, Agent, or Firm* — IP Legal Services, LLC

(57) ABSTRACT

Provided are an sTTI setting method for an sPUSCH in a short ITT frame structure and a specific operating method for an sPUSCH based on a shared DM-RS. In the method, a shared DM-RS within an SPUSCH is allocated only to a specific symbol included in a partial sTTI and is used in all sPUSCHs within a legacy TTI (=1 ms).

14 Claims, 12 Drawing Sheets

(51) Int. Cl.
  *H04L 27/26* (2006.01)
  *H04W 72/12* (2009.01)
  *H04L 1/18* (2006.01)

(52) U.S. Cl.
  CPC ..... *H04L 27/2613* (2013.01); *H04W 72/0446* (2013.01); *H04W 72/1205* (2013.01); *H04L 1/1812* (2013.01)

(56) References Cited

U.S. PATENT DOCUMENTS

| | | | |
|---|---|---|---|
| 2015/0319718 A1 | 11/2015 | Yang et al. | |
| 2015/0334762 A1 | 11/2015 | Yang et al. | |
| 2018/0049165 A1* | 2/2018 | Byun | H04W 72/0446 |
| 2019/0007248 A1* | 1/2019 | Takeda | H04W 28/06 |

OTHER PUBLICATIONS

LG Electronics, "Discussions on PUSCH design for NB-IoT", R1-160620, 3GPP TSG RAN WG1 Meeting #84, St Julian's, Malta, Feb. 15-19, 2016, pp. 1-7.

Ericsson et al., "New SI proposal: Study on Latency reduction techniques for LTE", RP-150465, 3GPP TSG RAN Meeting #67, Shanghai, China, Mar. 9-12, 2015, pp. 1-8.

3GPP, "3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.4.0 (Oct. 2015).

3GPP, R1-160927, "TR 36.881 V0.5.0 on Study on Latency reduction techniques for LTE".

LG Electronics, "Discussion on PUCCH design for Latency reduction", R1-160654, 3GPP TSG RAN WG1 Meeting #84, St Julian's, Malta, Feb. 15-19, 2016.

Ericsson, "Physical layer aspects of short TTI for uplink transmissions", R1-160939, 3GPP TSG RAN WG1 Meeting #84, Malta, Feb. 15-19, 2016, 2016, pp. 1-4.

Intel Corporation, "Aspects to consider for DL transmission of TTI shortening", R1-160436, 3GPP TSG-RAN WG1 #84, St Julian's, Malta, Feb. 15-19, 2016, pp. 1-8.

Nokia Networks et al., "DMRS for PUSCH with short TTI", R1-160779, 3GPP TSG-RAN WG1 Meeting #84, Malta, Feb. 15-19, 2016, pp. 1-5.

State Intellectual Property Office of People's Republic of China, Office Action of corresponding CN Patent Application No. 201780013601.8, dated Jun. 28, 2020.

* cited by examiner

METHOD FOR ESTABLISHING UPLINK DATA CHANNEL ON BASIS OF SHARED DEMODULATION REFERENCE SIGNAL, AND DEVICE THEREFOR

CROSS REFERENCE TO RELATED APPLICATIONS

This application is a National Stage Patent Application of PCT International Patent Application No. PCT/KR2017/002,536 (filed on Mar. 8, 2017) under 35 U.S.C. § 371, which claims priority to Korean Patent Application Nos. 10-2016-0037224 (filed on Mar. 28, 2016), and 10-2017-0022964 (filed on Feb. 21, 2017), the teachings of which are incorporated herein in their entireties by reference.

TECHNICAL FIELD

The present embodiments relate to a method for configuring a sPUSCH (short uplink data channel) based on a short Transmission Time Interval (sTTI) m the $3^{rd}$ generation partnership project (3GPP) long term evolution (LTE)/LTE-Advanced system.

BACKGROUND ART

Study and discussion about latency reduction in the 3GPP LTE/LTE-Advanced system are in progress. The main purpose for such latency reduction is to standardize the operation of a short Transmission Time Interval (hereinafter referred to as "short TTI" or "sTTI") in order to improve the throughput of TCP (Transmission Control Protocol).

To this end, RAN 2 (radio access network working group 2: RAN WG2) has been verifying the performance of the short TTI, and discussions on the feasibility, performance, and backward compatibility of TTI length between 0.5 ms and one OFDM symbol are underway.

Many studies have been conducted to develop the physical layer for such the short TTI. However, there is no specific configuring method introduced for the design of the short TTI for the sPUSCH.

DETAILED DESCRIPTION OF THE INVENTION

Technical Problem

In accordance with embodiments, a method may be provided for specifically configuring a short TTI (sTTI) for a sPUSCH (short uplink data channel) in the 3GPP LTE/LTE-Advanced system and specifically operating the sPUSCH based on a shared demodulation reference signal (DM-RS).

Technical Solution

In accordance with an embodiment, a method may be provided for configuring an uplink data channel (PUSCH) based on a shared demodulation reference signal (DM-RS) by a UE. The method may include: configuring a sPUSCH (short uplink data channel) based on a short TTI m one subframe, configuring the shared DM-RS in a symbol included in some short TTIs among a plurality of short TTIs included in the one subframe, and transmitting the sPUSCH to the base station.

In accordance with another embodiment, a method may be provided for configuring an uplink data channel (PUSCH) based on a shared demodulation reference signal (DM-RS) by a base station. The method may include transmitting a configuration information related to the position of the short TTI including a shared DM-RS and the position in the short TTI of a shared DM-RS to a UE, and receiving the shared DM-RS in a symbol included in some short TTIs among a plurality of short TTIs included in the one subframe from the UE.

In accordance with further another embodiment, a UE may be provided for transmitting an uplink data channel (PUSCH) based on a shared demodulation reference signal (DM-RS). The UE may include: a controller configured to configure a sPUSCH (short uplink data channel) based on a short TTI in one subframe and configure the shared DM-RS in a symbol included in some short TTIs among a plurality of short TTIs included in the one Subframe, and a transmitter configured to the sPUSCH to the base station.

In accordance with still another embodiment, a base station may be provided for configuring an uplink data channel (PUSCH) based on a shared demodulation reference signal (DM-RS). The base station may include: controller configured to generate a configuration information related to the position of the short TTI including a shared DM-RS and the position in the short TTI of a shared DM-RS to a UE, transmitter configured to transmit the configuration information, and receiver configured to receive the shared DM-RS in a symbol included in some short TTIs among a plurality of short TTIs included in the one subframe from the UE.

Advantageous Effects of the Invention

According to the embodiments, specific solutions may be provided for configuring the short TTI (sTTI) for the sPUSCH (short uplink data channel) and operating the sPUSCH based on the shared demodulation reference signal (DM-RS). These solutions are not to limited to the new frame structure, but are directly applied to the similar signal and channel.

BRIEF DESCRIPTION OF THE DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
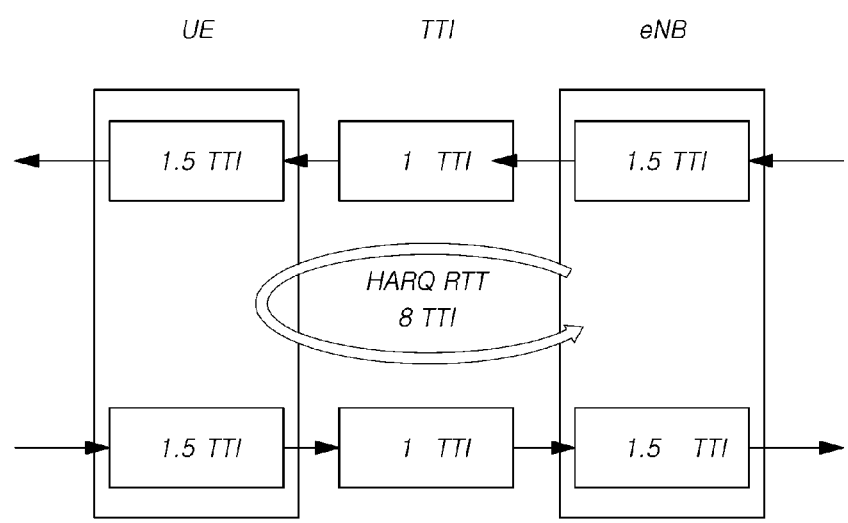
FIG. 1 is a diagram illustrating processing delays and a HARQ Round Trip Time (RTT) in an evolved NodeB (eNB) and a User Equipment (UE)

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the typical LTE coverage, or supports low power consumption, or may refer to a newly defined Release 13 low cost (or low complexity) UE category/type.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above-mentioned cells has a base station that controls a corresponding cell. Accordingly, the base station may be construed in two ways. i) The base station may be a device itself that provides a megacell, a macrocell, a microcell, a picocell, a femtocell, and a small cell in association with a wireless area, or ii) the base station may indicate a wireless area itself. In i), the base stations may be devices that a) interact with one another and b) are controlled by an identical entity or cooperate with each other to provide a predetermined wireless area. Based on a configuration type of a wireless area, an eNB, an RRH, an antenna, an RU, a Low Power Node (LPN), a point, a transmission/reception point, a transmission point, a reception point, and the like may be embodiments of a base station. In ii), a base station may be a wireless area itself where a terminal or a neighboring base station receives a signal from others or transmits a signal to others.

Therefore, a megacell, a macrocell, a microcell, a picocell, a femtocell, a small cell, an RRH, an antenna, an RU, an LPN, a point, an eNB, a transmission/reception point, a transmission point, and a reception point may be referred to as a base station.

In the specifications, the user equipment and the base station are used as two inclusive transceiving subjects to embody the technology and technical concepts described in the specifications. However, the user equipment and the base station may not be limited to a predetermined term or word. In the specification, the user equipment and the base station are used as two (uplink or downlink) inclusive transceiving subjects to embody the technology and technical concepts described in the specifications. However, the user equipment and the base station may not be limited to a predetermined term or word. Here, Uplink (UL) refers to data transmission and reception form a UE to a base station, and Downlink (DL) refers to data transmission and reception form a base station to a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. Embodiments of the present disclosure may be applicable to resource allocation in an asynchronous wireless communication scheme that is advanced through GSM, WCDMA, and HSPA, to be LTE and LTE-advanced, and the embodiments may be applicable to resource allocation in a synchronous wireless communication scheme that is advanced through CDMA and CDMA-2000, to be UMB. The present disclosure may not be limited to a specific wireless communication field and may include all technical fields in which the technical idea of the present disclosure is applicable.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or a macro cell (hereinafter, referred to as an 'eNB') and ii) at least one RRH that is connected to the eNB through an optical cable or an optical fiber, is controlled through a wire, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal, and a receiver may be a part of a multiple transmission/reception point. In an uplink, a transmitter may be a part of a terminal, and a receiver may be a part of a multiple transmission/reception point.

Hereinafter, signal transmission and reception through a PUCCH, a PUSCH, a PDCCH, an EPDCCH, a PDSCH, or the like may have the same meaning of the expression "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" may have the meaning of the expression "an EPDCCH is transmitted or received, or a signal is transmitted or received through an EPDCCH".

That is, a physical downlink control channel used herein may indicate a PDCCH or an EPDCCH. That is, the physical downlink control channel may include a PDCCH and an EPDCCH.

For convenience and ease of understanding, some embodiments are described using a PDCCH in the present disclosure. However, an EPDCCH may to be identically applied to the same embodiments. In addition, some embodiments are described using an EPDCCH in the present disclosure. However, a PDCCH may be identically applied to the same embodiments.

Meanwhile, higher layer signaling includes a radio resource control (RRC) signaling that transmits RRC information including an RRC parameter.

An eNB executes downlink transmission to terminals. The eNB may transmit a Physical Downlink Shared Channel (PDSCH) which is a primary physical channel for unicast transmission and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through a channel will be described as transmission and reception of a corresponding channel.

Latency Reduction in RAM

Latency reduction Study Item is approved at RAN plenary #69 meeting[1]. The main purpose of latency reduction is to standardize the operation of a short Transmission Time Interval (hereinafter referred to as "short TTI" or "sTTI") in order to improve the throughput of TCP[2].

Studies on the potential impacts related to RAN1 within the following range are in progress [1].

Assess specification impact and study feasibility and performance of TTI lengths between 0.5 ms and one OFDM symbol, taking into account impact on reference signals and physical layer control signaling
backwards compatibility shall be preserved (thus allowing normal operation of pre-Rel 13 UEs on the same carrier);
Latency reduction can be achieved by the following physical layer techniques:
short TTI
reduced processing time in implementation
new frame structure of TDD Additional agreements at 3GPP RAN WG1 #84 meeting are as follow.

Agreements:

Following design assumptions are considered:
No shortened TTI spans over subframe boundary
At least for SIBs and paging, PDCCH and legacy PDSCH are used for scheduling
The potential specific impacts for the followings are studied
UE is expected to receive a sPDSCH at least for downlink unicast
sPDSCH refers PDSCH carrying data in a short TTI
UE is expected to receive PDSCH for downlink unicast
FFS whether a UE is expected to receive both sPDSCH and PDSCH for downlink unicast simultaneously
FFS: The number of supported short TTIs
If the number of supported short TTIs is more than one, Agreements:

Following design assumptions are used for the study
From eNB perspective, existing non-sTTI and sTTI can be FDMed in the same subframe in the same carrier
FFS: Other multiplexing method(s) with existing non-sTTI for UE supporting latency reduction features Agreements:

In this study, following aspects are assumed in RAN1.
PSS/SSS, PBCH, PCFICH and PRACH, Random access, SIB and Paging procedures are not modified.
Following aspects are further studied in the next RAN1 meeting
Note: But the study is not limited to them.
Design of sPUSCH DM-RS
Alt.1: DM-RS symbol shared by multiple short-TTIs within the same subframe
Alt.2: DM-RS contained in each sPUSCH
HARQ for sPUSCH
Whether/how to realize asynchronous and/or synchronous HARQ
sTTI operation for Pcell and/or SCells by (e)CA(Carrier Aggregation) in addition to non-(e)CA case Basically, the average down-link latency calculation calculates the latency according to a following procedure [3].

Following the same approach as in section B.2.1 in 3GPP TR 36.912, the LTE U-plane one-way latency for a scheduled UE consists of the fixed node processing delays and 1 TTI duration for transmission, as shown in FIG. 1 below. Assuming the processing times can be scaled by the same factor of TTI reduction keeping the same number of HARQ processes, the one way latency can be calculated as $$D = 1.5 \; TTI \; (eNB \text{ processing and scheduling}) +$$
$$1 \; TTI \; (\text{transmission}) + 1.5 \; TTI \; (UE \text{ processing}) +$$
$$n * 8 \; TTI \; (HARQ \text{ retransmissions})$$
$$= (4 + n*8) \; TTI.$$

Considering a typical case where there would be 0 or 1 retransmission, and assuming error probability of the first transmission to be p, the delay is given by $$D=(4+p*8)TTI.$$

So, for 0% BLER, D=4*TTI,

And for 10% BLER, D=4.8*TTI.

Average UE initiated UL transmission latency calculation Assume the UE is in connected/synchronized mode and wants to do UL transmission, e.g., to send TCP ACK. Following table 1 (UL transmission latency calculation) shows the steps and their corresponding contribution to the UL transmission latency. To be consistent in comparison of DL and UL, we add the eNB processing delay in the UL after the UL data is received by the eNB (step 7).

TABLE 1

| Step | Description | Delay |
|---|---|---|
| 1. | Average delay to next SR opportunity | SR periodicity/2 |
| 2. | UE sends SR | 1 TTI |
| 3. | eNB decodes SR and generates scheduling grant | 3 TTI |
| 4. | Transmission of scheduling grant (assumed always error-free) | 1 TTI |
| 5. | UE processing delay (decoding Scheduling grant + L1 encoding of data) | 3 TTI |
| 6. | UE sends UL transmission | (1 + p * 8) TTI where p is initial BLER. |
| 7. | eNB receives and decodes the UL data | 1.5 TTI |

In the table above, steps 1-4 and half delay of step 5 is assumed to be due to SR(Scheduling Request), and rest is assumed for UL data transmission in values shown in Table 4

Resource Mapping of Short TTI 131

Figure 2:
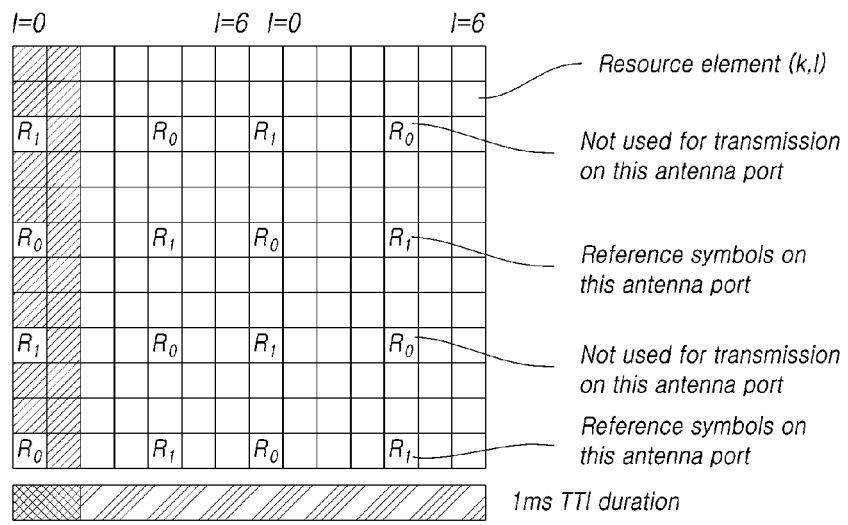
FIG. 2 is a diagram illustrating resource mapping per Physical Resource Block (PRB) in one subframe.
Figure 2:
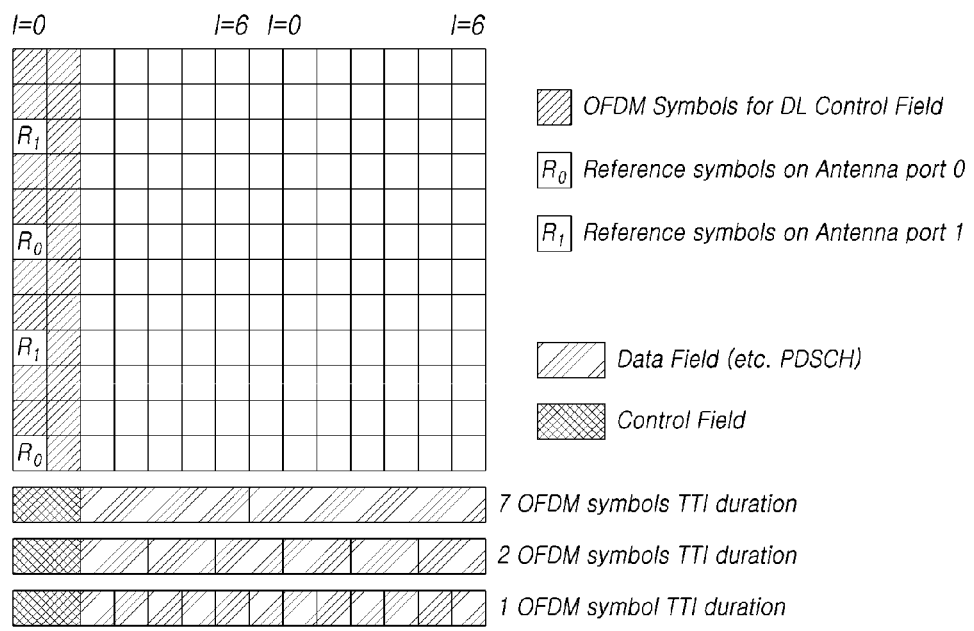

In FIG. 2, the resource map above is the legacy resource mapping per PRB in one subframe, considering 2 Antenna ports and 2 OFDM symbols control field. In FIG. 2, the resource map below is the short TTI resource mapping, considering 2 OFDM symbols used for the control field in order to ensure the backward compatibility. The loss rates ($L_{legacy}$, e.g. 5%-50%) of the physical layer in short TTI duration are assumed.

TBS Calculation of Short TTI

According to the resource mapping and the TBS calculation formula given above, the loss rate of the physical layer for legacy PDSCH is calculated as follows:

$$L_{legacy} = \frac{\text{the number of } \square \text{ reference symbols within } PDSCH}{\text{the number of } REs \text{ within } PDSCH} = \frac{12}{144} = 8.3\%$$

For different short TTI duration, The TBS of short TTI PDSCH is calculated as the following table 2 (TBS calculation for different TTI duration):

TABLE 2

| TTI Duration | TBS of short TTI PDSCH ($TBS_{short}$) |
|---|---|
| 7 OFDM symbol | First time slot: $TBS_{short} = TBS_{legacy} \times \frac{60}{144} \times \frac{1 - L_{short}}{8.3\%}$ Second time slot: $TBS_{short} = TBS_{legacy} \times \frac{84}{144} \times \frac{1 - L_{short}}{8.3\%}$ |
| 2 OFDM symbol | $TBS_{short} = TBS_{legacy} \times \frac{24}{144} \times \frac{1 - L_{short}}{8.3\%}$ |
| 1 OFDM symbol | $TBS_{short} = TBS_{legacy} \times \frac{12}{144} \times \frac{1 - L_{short}}{8.3\%}$ |

As mentioned above, studies on the physical layer for such the short TTI have been ongoing, and there is no specific configuring method introduced for the design of the short TTI for the sPUSCH.

In accordance with embodiments, a method may be provided for specifically configuring the short TTI (sTTI) for the sPUSCH (short uplink data channel or short physical uplink shared channel) in the 3GPP LTE/LTE-Advanced system and for specifically operating the sPUSCH based on a shared demodulation reference signal (DM-RS).

Figure 3:
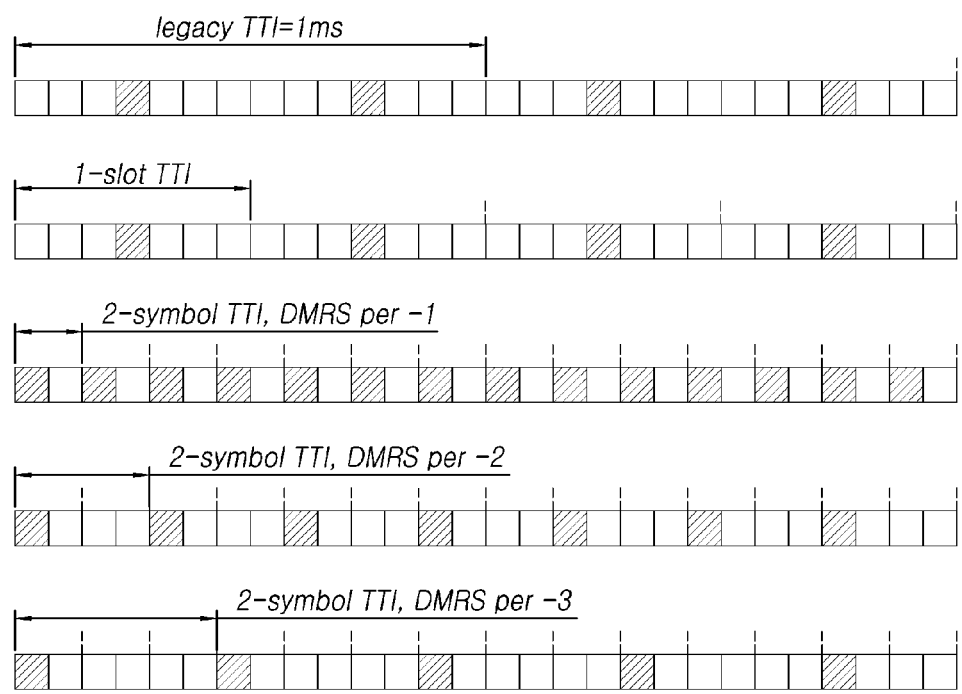
FIG. 3 is a diagram illustrating various sTTI configuration candidates for sPUSCH compared to legacy TTI.

Unlink the legacy LTE/LTE-Advanced frame structure (TTI=1 ms=14 OFDM symbols), the short TTI may be configured of a set of 1, 2, 3, 4, 7 symbols. For example, FIG. 3 shows the sTTI structures.

Unlike the legacy downlink frame structure, all the REs (Resource Elements) of the DM-RS symbol in the RB (Resource Block) are allocated for the channel estimation purpose in the uplink frame structure.

At this time, if the legacy PUSCH structure is reused and the sTTI for the sPUSCH is configured, the overhead can be greatly increased. Therefore, the sharing RS structure in the DM-RS for the current sPUSCH is considered as an alternative.

Embodiment 1. Allocating a Shared DM-RS in a sPUSCH Only at a Specific Symbol and Using it for all sPUSCH within the Legacy TTI (=1 ms)

According to this embodiment, the shared DM-RS is defined only in some of sTTIs for the sPUSCH.

Figure 4:
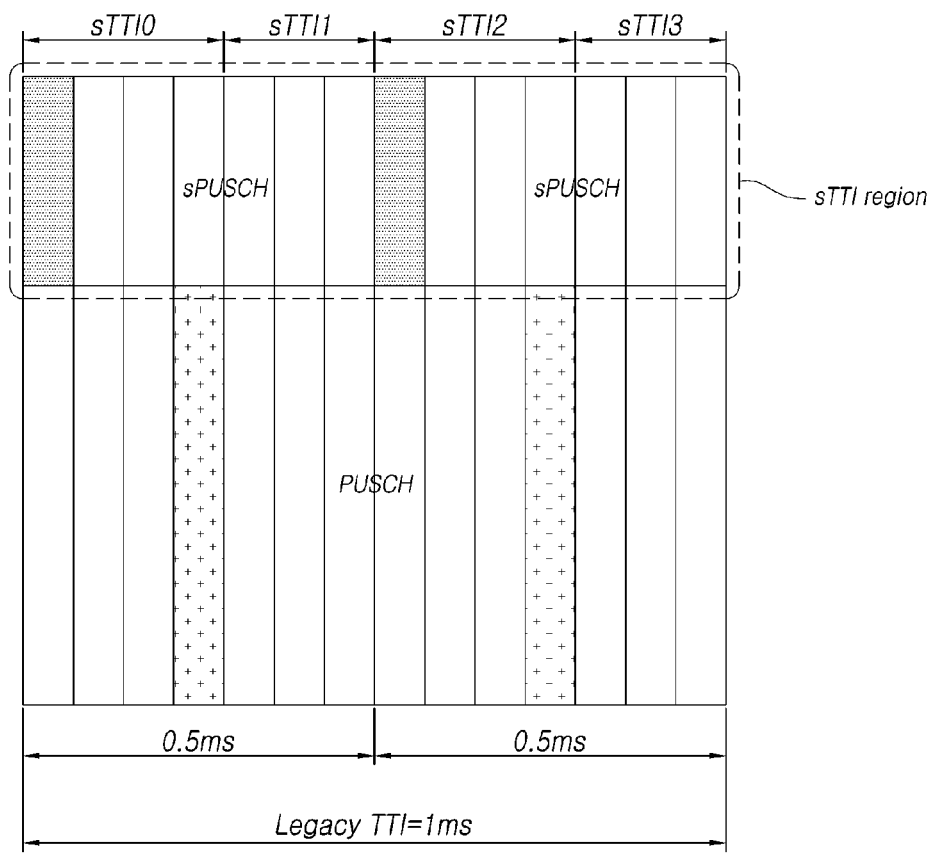
FIG. 4 is a diagram illustrating an example of a shared DM-RS allocation according to an embodiment 1.

For example, according to this embodiment, the DM-RS symbol is included only in some of the sTTIs as shown in FIG. 4. As shown in FIG. 4, the DM-RS symbol is included only in sTTI0 among sTTI0 and sTTI1, and the DM-RS symbol is included only in sTTI2 among sTTI2 and sTTI3.

If the sTTI for the sPUSCH is designed for reusing the legacy PUSCH structure, all of REs for a symbol which the DM-RS is allocated becomes a reference signal. Accordingly, the data cannot be transmitted. Therefore, the RS overhead in UL sTTI may be relatively more than it in DL sTTI.

As a result, the shared DM-RS may be applied to some regions so that such the overhead can be reduced. The above-described method may reduce such the UL DM-RS overhead.

Figure 5:
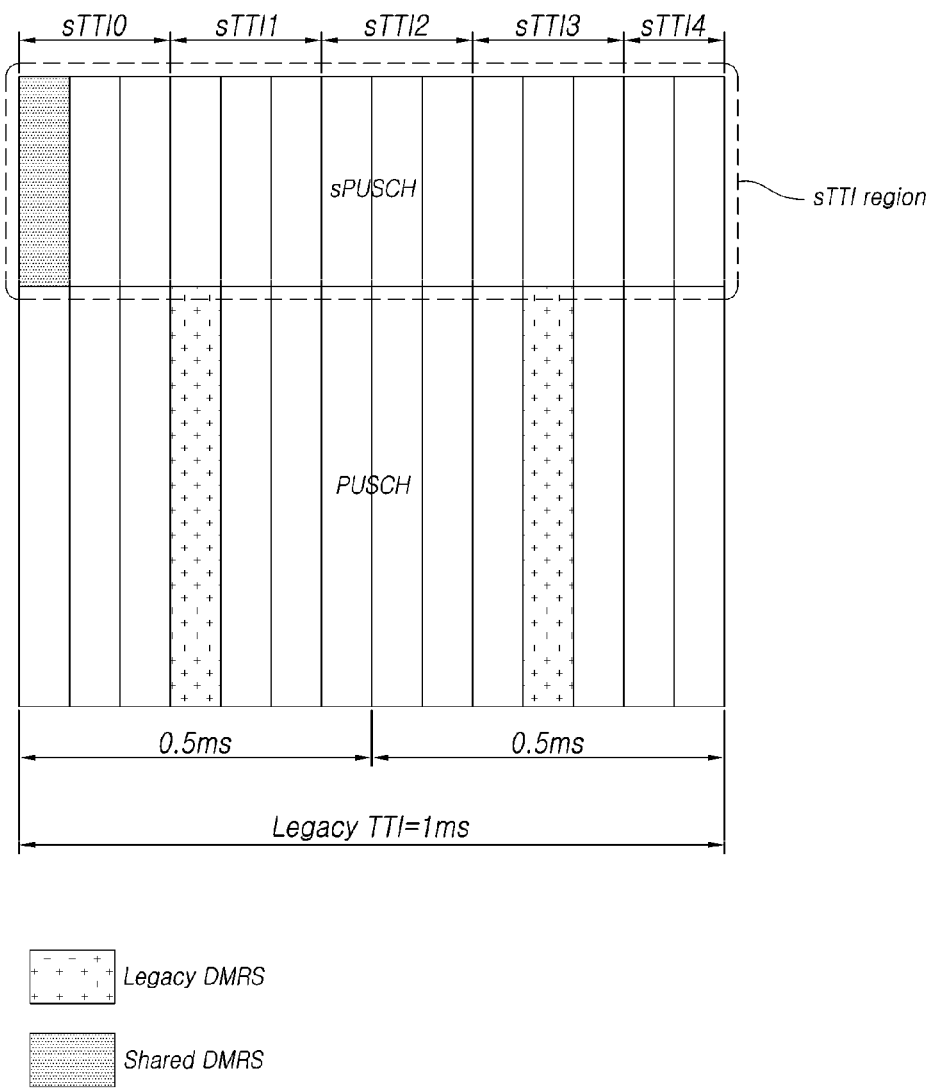
FIG. 5 is a diagram for describing a concept of shared DM-RS allocation according to an embodiment 1-1.

Embodiment 1-1. Configuring the DM-RS Only at the First sTTI in the Legacy TTI FIG. 5 is a diagram showing allocating shared DM-RS according to the embodiment 1-1. In this embodiment, the DM-RS allocated to a single symbol is shared with all sTTIs in a legacy TTI (=1 ms).

In this embodiment, it is assumed that there is almost no channel change in all sTTIs in the subframe. Multiple sTTIs may be enabled to share the DM-RS by following two methods.

- The UE can set a shared DM-RS position in a short TTI and a position of the sTTI including the shared DM-RS according to a predefined pattern.
- It is possible to set the shared DM-RS position in the short TTI and the position of the sTTI including the shared DM-RS based on the dynamic signaling.

Since the eNB manages the DM-RS sharing within the above-mentioned sTTI, each UE can transmit its own sTTI and DM-RS, respectively.

In addition, when performing additional power-boosting for the DM-RS within the sTTI, it is advantageous to place the DM-RS at the first of the symbols. This is because time-delay can occur when power is amplified momentarily in the power amplifier of the UE. However, if the DM-RS is located in the first symbol in the sTTI, the power reduction for the following data symbols can be minimized by the relatively short delay. However, the position of the DM-RS symbol is not limited to a specification location in this embodiment.

Embodiment 1-2. Multiplexing a DM-RS for Multi-User/Multi-Layer

In this embodiment, multiplexing may be introduced for the DM-RS of multiple users or the DM-RS for the single UE transmitting multiple layers within legacy TTI (=1 ms).

In this embodiment, it is assumed that there is almost no channel change in all sTTIs in the subframe.

Basically, the DM-RS sharing structure of the embodiment 1 is inherited as it is, but an additional multiplexing approach is required in the DM-RS sharing structure.

Figure 6:
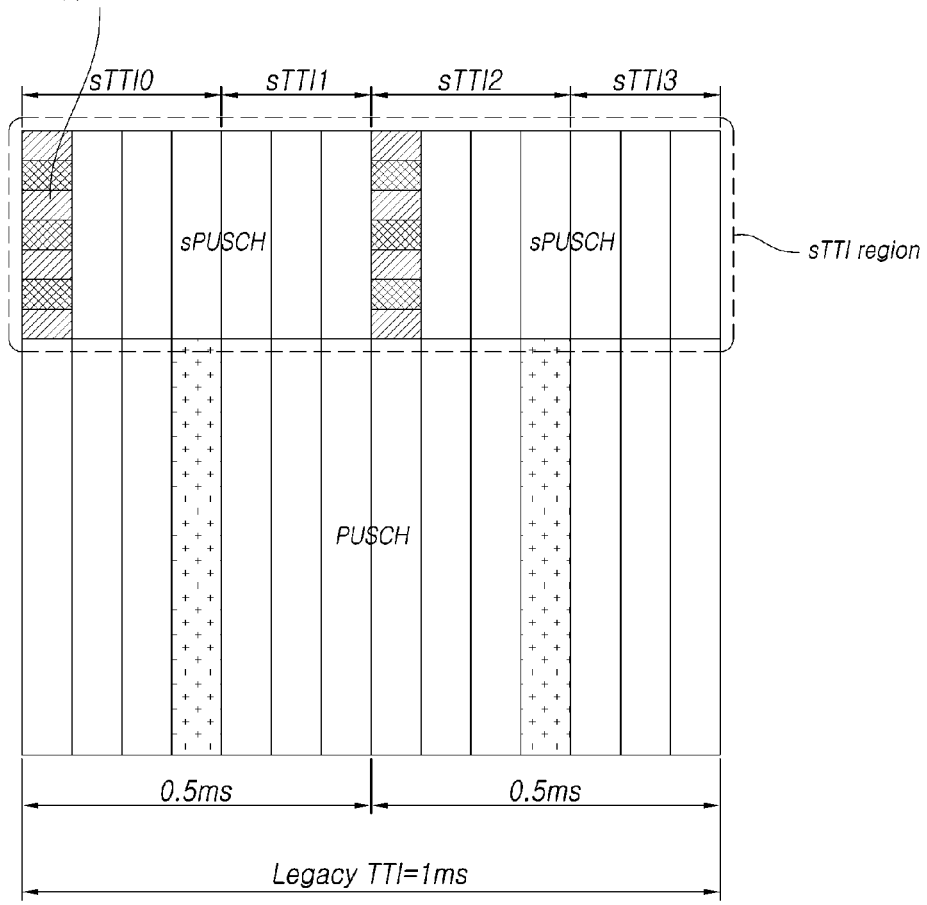
FIG. 6 illustrates DM-RS overlapping based on a FDM scheme according to an embodiment 1-2.
Figure 7:
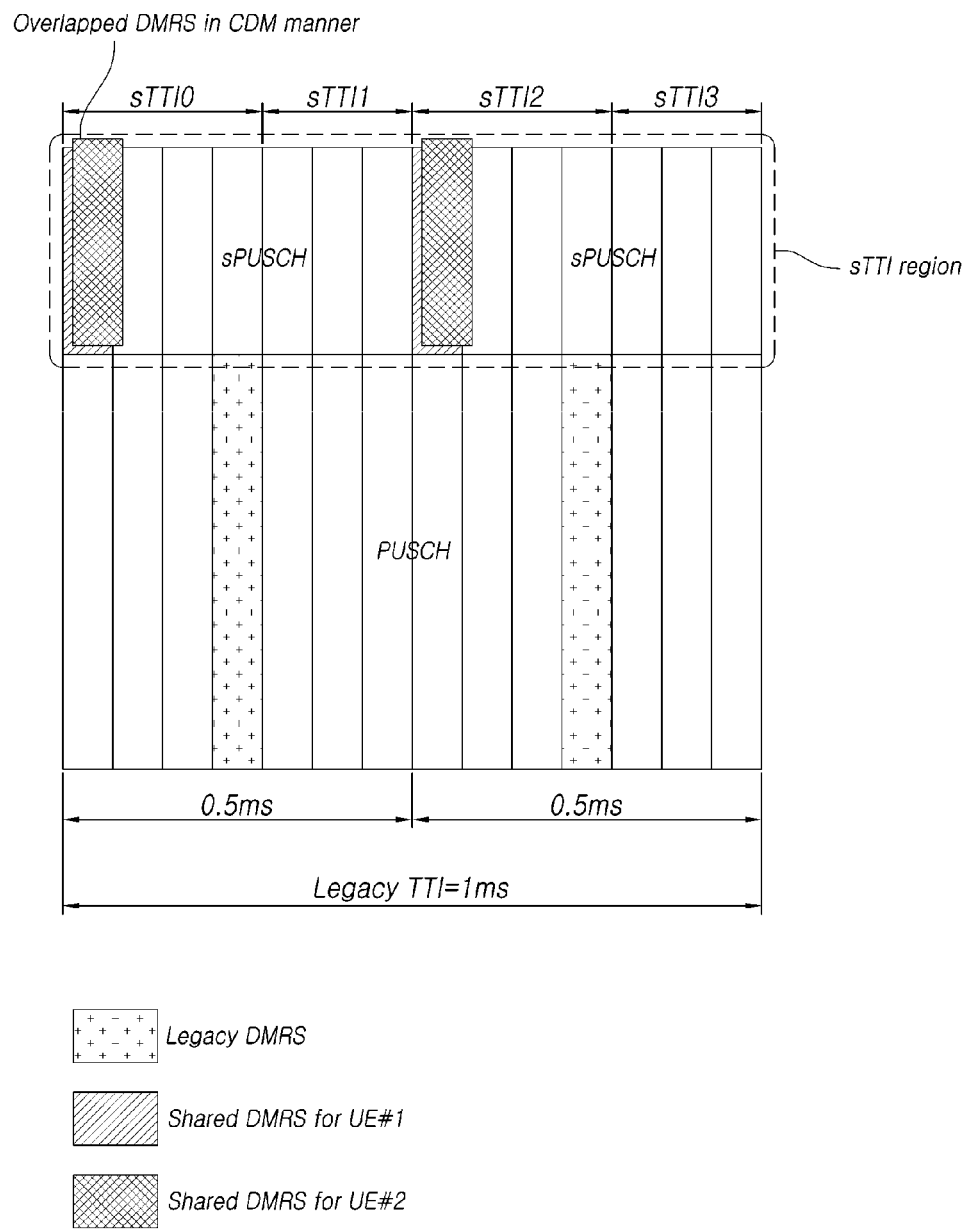
FIG. 7 illustrates DM-RS overlapping based on a CDM scheme according to an embodiment 1-2.

As shown in FIG. 6 and FIG. 7, the multiplexing of the DM-RS can be performed based on i) frequency division multiplexing (FDM) or ii) code division multiplexing (CDM). FIG. 6 illustrates multiplexing a DM-RS based on a FDM scheme, and FIG. 7 illustrates multiplexing a DM-RS based on a CDM scheme.

Since the FDM scheme uses REs divided within a given symbol, a channel estimation error may occur due to a decrease in RS samples.

Conversely, the CDM scheme transmits data in all REs in a symbol, but mutual interference may occur because they are not orthogonal to each other.

Basically, the following applications are possible.

sTTI single user allocation (1-layer transmission)
  Single DM-RS+Rank-1 sTTI-based sPUSCH transmission sTTI Single user allocation (Multiple 'N' layers Transmission)
  Shared DM-RS+Rank-N sTTI-based PUSCH transmission sTTI multi-user allocation
  Shared DM-RS+Rank-N sTTI-based PUSCH transmission

Figure 8:
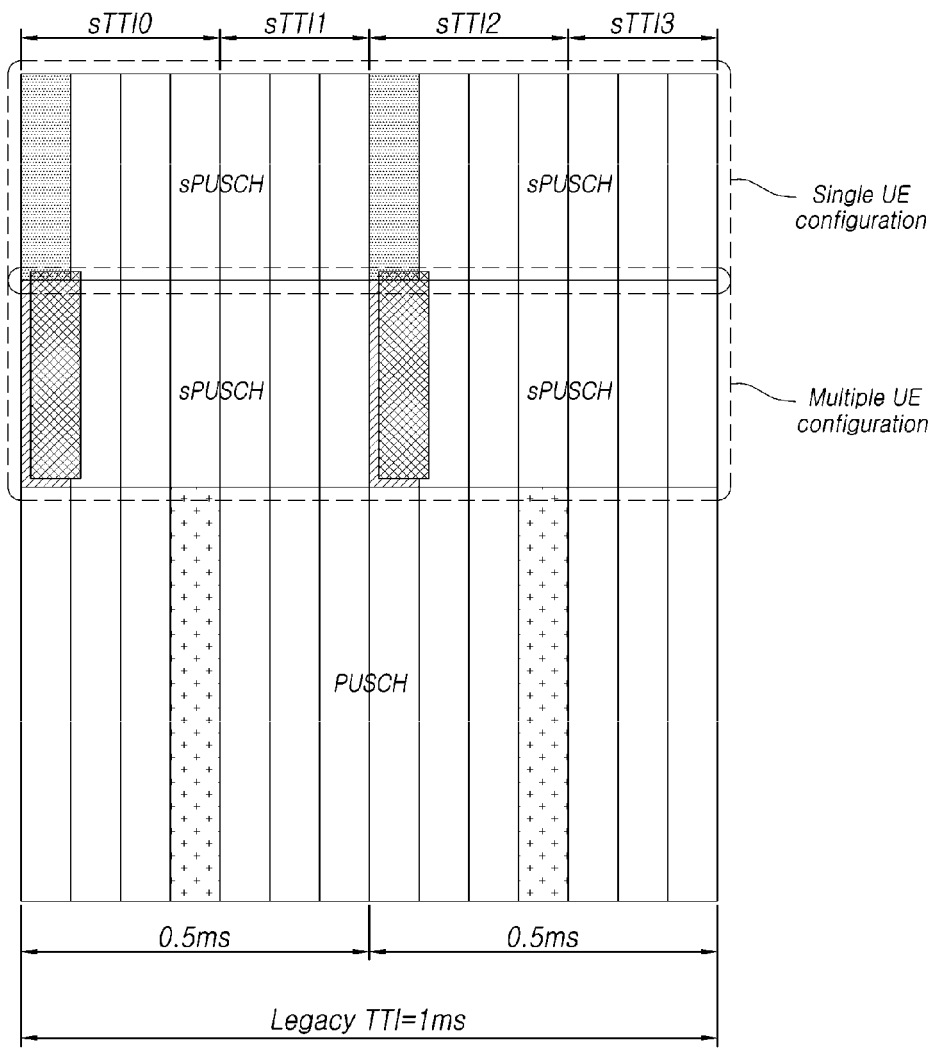
FIG. 8 illustrates an example of configuring the sTTI region according to an embodiment 2.

Embodiment 2. Separately Configuring a sPUSCH Region for a Single UE and a sPUSCH Region for Multiple UEs FIG. 8 is a diagram illustrating an example of configuring a sTTI region according to the embodiment 2.

In the embodiment 2, when the sPUSCH is used, the shared DM-RS is considered to minimize the overhead for RS. Therefore, if the sPUSCH region is separately configured for each user, such configuration can be the most advantageous sTTI structure in the DM-RS sharing. However, when the sPUSCH region is separately configured for each UE, resource reservation may be required for all latency reduction service UEs. Such requirement may cause restrictions on scheduling.

In the sTTI configuration method according to the embodiment 2, the sPUSCH region which can be independently allocated to specific UEs may be separately configured from the sPUSCH region where can be independently used for the multiple users.

Embodiment 2-1. Commonly Using the Same DM-RS Port in the sPUSCH Configuration Region for the Single UE

Embodiment 2-2. Determining sTTI Paring Dependent on the DM-RS Port in Advance Based on the Shared DM-RS Symbol in the sPUSCH Configuration Region for the Multiple UEs Hereinafter, a sTTI-based sPUSCH configuration method and a specific method for configuring the shared DM-RS according to embodiments will be described below. The methods according to embodiments are not limited to the new frame structure. For example, the methods according to the embodiment can be applied to typical frame structures, such as similar signals and channels.

Figure 9:
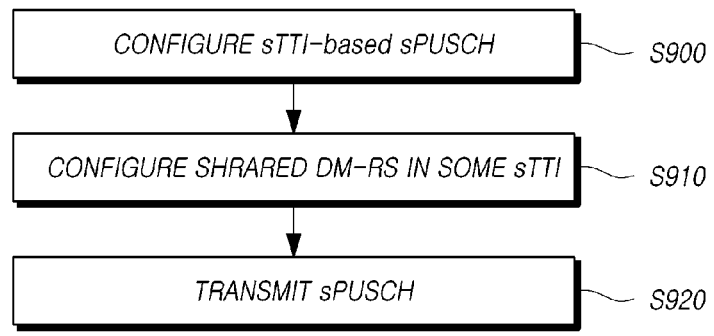
FIG. 9 is a flowchart illustrating a method of configuring the shared DM-RS-based sPUSCH in an sTTI frame structure of the UE according to embodiments.

FIG. 9 is a flowchart illustrating a method of configuring a shared DM-RS-based sPUSCH in a sTTI frame structure of a UE according to embodiments.

Referring to FIG. 9, the UE configures the sPUSCH based on the sTTI at S900 and configures the shared DM-RS in at least one sTTI among a plurality of sTTIs included in one Subframe at S910.

For example, the UE may configure the shared DM-RS for symbols included in only one of a plurality of sTTIs included in one subframe.

In configuring a shared DM-RS for a symbol included in at least one sTTI, the UE may configure the shared DM-RS to a first symbol among the symbols included in the sTTI.

Also, in configuring the shared DM-RS in the sTTI frame structure, the to UE may configure the shared DM-RS by applying the multiplexing concept. The UE may configure the DM-RS of the single UE transmitting the DM-RS or a multi-layer of the multiple users by performing frequency division modulation (FDM) or code division modulation (CDM) on a symbol for which the shared DM-RS is configured.

Also, the UE may separate the sPUSCH region into a region for the single UE and a region for the plurality of UEs and may independently configure the shared DM-RS in each sPUSCH region.

In this embodiment, the shared DM-RS configured in the sPUSCH region for the single UE is configured in the same manner as the above-mentioned embodiment 1-1, and the shared DM-RS configured in the sPUSCH region for a plurality of UEs is configured in the same manner as the above-mentioned embodiment 1-2.

The UE may receive configuration information related to the position of the short TTI including the shared DM-RS and the position in the short TTI of the shared DM-RS from the base station, and the UE may configure the shared DM-RS according to the received configuration information. The UE may configure the position of the short TTI including the shared DM-RS and the position in the short TTI of the shared DM-RS according to either the predefined pattern or dynamically.

The UE transmits the sTTI with the shared DM-RS and the sTTI not configured with the shared DM-RS at S920.

Figure 10:
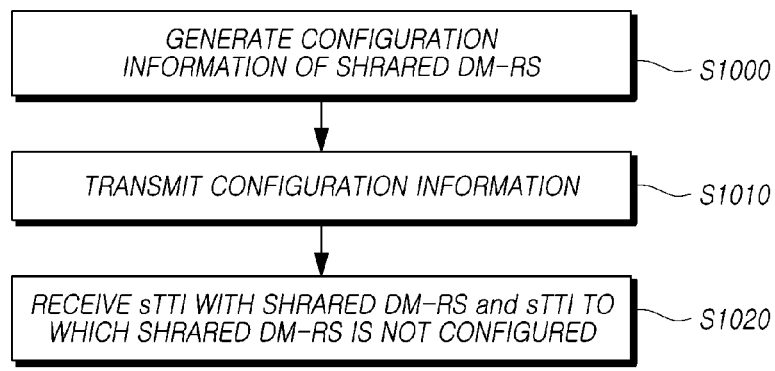
FIG. 10 is a flowchart illustrating a method of configuring a shared DM-RS-based sPUSCH in an sTTI frame structure of the base station according to embodiments.

FIG. 10 is a flowchart illustrating a method of configuring a shared DM-RS-based sPUSCH in a sTTI frame structure of a base station according to embodiments.

Referring to FIG. 10, the base station according to an embodiment generates the configuration information related to the position of a short Transmission Time Interval (sTTI) including a shared DM-RS and the position in the short ITT of a shared DM-RS at S1000 and transmits it to the UE at S1010.

The base station enables the UE to configure the shared DM-RS to a symbol included in at least one sTTI in the sTTI frame structure according to the configuration information.

At this time, the base station may configure the shared DM-RS in the sTTI frame structure according to a predefined pattern, or the base station may dynamically configure the shared DM-RS.

The base station receives the sTTI configured with the shared DM-RS and the sTTI not configured with the shared DM-RS at S1020.

Figure 11:
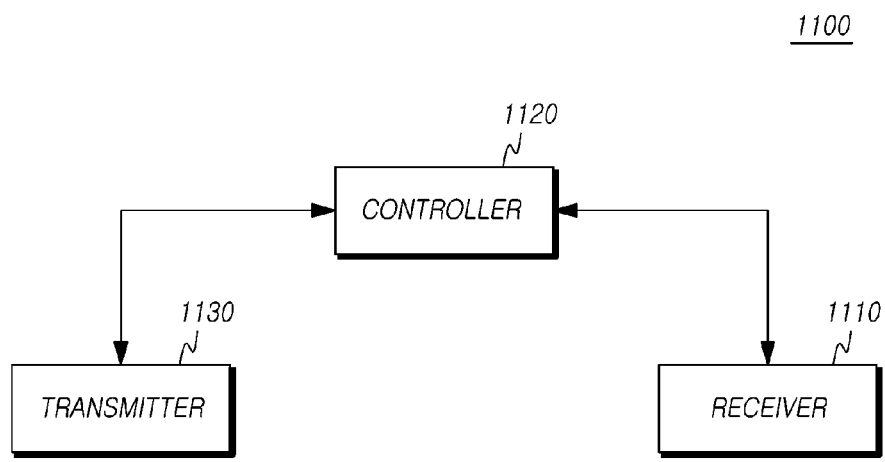
FIG. 11 is a diagram illustrating a UE according to an embodiment.

FIG. 11 is a diagram illustrating a UE according to an embodiment.

Referring to FIG. 11, a UE 1100 according to an embodiment may include a receiver 1110, a controller 1120, and a transmitter 1130.

The receiver 1110 may receive downlink control information, data, and a message from a base station via a corresponding channel.

Also, the controller 1120 may control operations of the UE 1100 for configuring a short TTI (sTTI) for a sPUSCH (short uplink data channel) and specifically operating the sPUSCH based on the shared DM-RS according to embodiments.

The transmitter 1130 may receive uplink control information, data, and a to message to the base station via a corresponding channel.

Figure 12:
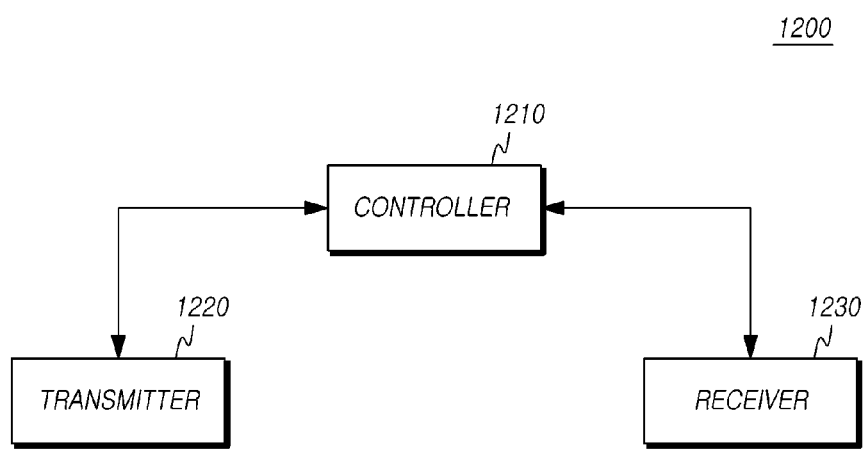
FIG. 12 is a diagram illustrating a base station according to an embodiment.

FIG. 12 is a diagram illustrating a base station according to an embodiment.

Referring to FIG. 12, a base station according to an embodiment 1200 includes a controller 1210, a transmitter 1220, and a receiver 1230.

The controller 1210 may control operations of the base station (e.g., eNB) 1200 for configuring a short TTI (sTTI) for a sPUSCH (short uplink data channel) and specifically operating the sPUSCH based on the shared DM-RS according to embodiments. Specifically, the controller 1210 may configure information associated with an sPDCCH region.

The transmitter 1220 and the receiver 1230 are used for transmitting signals, messages, and data to a UE and receiving signals, messages, and data from the UE for implementing the embodiments.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

APPENDIX

[1] Ericsson, Huawei, "New SI proposal Study on Latency reduction techniques for LTE", RP-150465, Shanghai, China, Mar. 9-12, 2015.
[2] R2-155008, "TR 36.881 v0.4.0 on Study on Latency reduction techniques for LTE", Ericsson (Rapporteur)
[3] R1-160927, "TR 36.881-v0.5.0 on Study on Latency reduction techniques for LTE", Ericsson (Rapporteur)

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

Under 35 USC § 119(a), this application claims priority from Korean Patent Application Nos. 10-2016-0037224 & 10-2017-0022964, filed on Mar. 28, 2016 & Feb. 21, 2017, which are hereby incorporated by reference for all purposes as if fully set forth herein. In addition, this application claims priority to countries other than the United States for the same reason, the entire contents of which are incorporated herein by reference.

The invention claimed is:

1. A method for configuring a physical uplink shared channel (PUSCH) based on a shared demodulation reference signal (DM-RS) by a user equipment (UE), the method comprising:
configuring a sPUSCH (short physical uplink shared channel) based on a short Transmission Time Interval (sTTI) in one subframe;
configuring a shared DM-RS in a symbol included in predetermined short TTIs among a plurality of short TTIs included in the one subframe; and
transmitting the sPUSCH to the base station,
wherein the UE receives configuration information related to a position of the short TTI including the shared DM-RS and a position of the shared DM-RS in the short TTI from the base station, and the UE dynamically configures the position of the short TTI including the shared DM-RS and the position of the shared DM-RS in the short TTI according to the received configuration information.

2. The method of claim 1, wherein the configuring a shared DM-RS comprising: configuring the shared DM-RS in a first symbol among symbols included in the predetermined short TTI.

3. The method of claim 1, wherein the symbol to be configured with the shared DM-RS is multiplexed based on one of a frequency-division-modulation scheme and a code-division-modulation scheme, and the multiplexed shared DM-RS is configured in the symbol.

4. The method of claim 1, wherein a sPUSCH region for a single UE is separated from a sPUSCH region for the multiple UEs, and the shared DM-RS is independently configured in each of the sPUSCH regions.

5. The method of claim 1, wherein, the UE receives configuration information related to a position of the short TTI including the shared DM-RS and a position in the short TTI of the shared DM-RS from the base station and configures the position of the short TTI including the shared DM-RS and the position in the short TTI of the shared DM-RS according to a predefined pattern.

6. A method for configuring a physical uplink shared channel (PUSCH) based on a shared demodulation reference signal (DM-RS) by a base station, the method comprising:
transmitting configuration information related to a position of a short Transmission Time Interval (sTTI) including a shared DM-RS and a position of a DM-RS in the short TTI to a user equipment (UE); and
receiving a sPUSCH (short physical uplink shared channel) including a subframe configured for the shared DM-RS, which is configured and transmitted by the UE based on the configuration information, wherein the shared DM-RS is included in a symbol in at least one of a plurality of short TTIs in the subframe,
wherein the UE receives the configuration information from the base station, dynamically configures the position of the short TTI including the shared DM-RS and the position of the shared DM-RS in the short TTI according to the received configuration information, and transmits the sPUSCH including the subframe configured for the shared DM-RS to the base station.

7. The method of claim 6, wherein the symbol configured with the shared DM-RS is a first symbol among symbols included in the short TTI which the shared DM-RS includes.

8. The method of claim 6, wherein the shared DM-RS is multiplexed based on one of a frequency-division-modulation scheme and a code-division-modulation scheme, and the multiplexed shared DM-RS is configured in the symbol.

9. The method of claim 6, wherein a sPUSCH (short physical uplink shared channel) region for a single UE is separated from a sPUSCH (short physical uplink shared channel) region for the multiple UEs, and the shared DM-RS is independently configured in each of the sPUSCH regions.

10. A user equipment (UE) for transmitting a physical uplink shared channel (PUSCH) based on a shared demodulation reference signal (DM-RS), the UE comprising:
a controller configured to configure a sPUSCH (short physical uplink shared channel) based on a short Transmission Time Interval (sTTI) in one subframe and configure a shared DM-RS in a symbol included in some short TTIs among a plurality of short TTIs included in one subframe; and
a transmitter configured to transmit the sPUSCH to the base station,
wherein, the UE receives configuration information related to a position of the short TTI including the shared DM-RS and a position of the shared DM-RS in the short TTI from the base station, and the UE dynamically configures the position of the short TTI including the shared DM-RS and the position of the shared DM-RS in the short TTI according to the received configuration information.

11. The UE of claim 10, wherein the symbol configured with the shared DM-RS is a first symbol among the symbols included in the short TTI which the shared DM-RS includes.

12. The UE of claim 10, wherein the shared DM-RS is modulated based on one of a frequency-division-modulation scheme and a code-division-modulation scheme, and the modulated shared DM-RS is configured in the symbol.

13. The UE of claim 10, wherein a sPUSCH region for a single UE is separated from a sPUSCH region for the multiple UEs, and the shared DM-RS is independently configured in each of the sPUSCH regions.

14. The UE of claim 10, wherein, the UE receives configuration information related to a position of the short TTI including the shared DM-RS and a position of the shared DM-RS in the short TTI from the base station, and the UE configures the position of the short TTI including the shared DM-RS and the position of the shared DM-RS in the short TTI according to a predefined pattern.

* * * * *